US008411709B1

(12) United States Patent  (10) Patent No.: US 8,411,709 B1
Choi et al.  (45) Date of Patent: Apr. 2, 2013

(54) USE OF PREVIOUSLY BUFFERED STATE INFORMATION TO DECODE IN AN HYBRID AUTOMATIC REPEAT REQUEST (H-ARQ) TRANSMISSION MODE

(75) Inventors: Joonsang Choi, Sunnyvale, CA (US); Rajesh Juluri, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 342 days.

(21) Appl. No.: 11/945,151

(22) Filed: Nov. 26, 2007

Related U.S. Application Data

(60) Provisional application No. 60/867,317, filed on Nov. 27, 2006.

(51) Int. Cl.
*H04J 99/00* (2009.01)
(52) U.S. Cl. .......................... 370/546; 370/216; 370/412
(58) Field of Classification Search .................. 370/216, 370/412, 546
See application file for complete search history.

(56) References Cited

U.S. PATENT DOCUMENTS

| | | | |
|---|---|---|---|
| 6,222,889 B1* | 4/2001 | Lee | 375/265 |
| 6,829,313 B1 | 12/2004 | Xu | |
| 7,180,901 B2 | 2/2007 | Chang et al. | |
| 7,200,799 B2 | 4/2007 | Wang et al. | |
| 7,213,194 B2 | 5/2007 | Nieminen | |
| 7,360,141 B2* | 4/2008 | Michel et al. | 714/751 |
| 7,965,710 B1 | 6/2011 | Choi | |
| 8,345,533 B1 | 1/2013 | Zhao | |
| 2002/0053058 A1* | 5/2002 | Lee et al. | 714/748 |
| 2003/0098804 A1* | 5/2003 | Ekstrand et al. | 341/107 |
| 2003/0126551 A1* | 7/2003 | Mantha et al. | 714/790 |
| 2004/0141525 A1* | 7/2004 | Bhushan et al. | 370/473 |
| 2004/0148546 A1* | 7/2004 | Meyer et al. | 714/18 |
| 2004/0223473 A1* | 11/2004 | Ha et al. | 370/335 |
| 2005/0276266 A1* | 12/2005 | Terry | 370/394 |
| 2006/0084389 A1* | 4/2006 | Beale et al. | 455/67.11 |
| 2007/0016838 A1* | 1/2007 | Mielczarek et al. | 714/749 |
| 2007/0092013 A1 | 4/2007 | Cahn et al. | |
| 2008/0090583 A1* | 4/2008 | Wang et al. | 455/452.1 |
| 2008/0279322 A1 | 11/2008 | Franovici et al. | |
| 2010/0077275 A1 | 3/2010 | Yu et al. | |

OTHER PUBLICATIONS

"802.16-2004 IEEE Standards", (Oct. 1, 2004),857 pages.
"802.16e IEEE Standard", (Feb. 28, 2006),822 pages.
"Advisory Action", U.S. Appl. No. 11/945,183, (Nov. 9, 2010), 2 pages.
"Final Office Action", U.S. Appl. No. 11/945,183, (Sep. 13, 2010), 12 pages.
"Non-Final Office Action", U.S. Appl. No. 11/945,183, (Apr. 5, 2010), 8 pages.
"Notice of Allowance", U.S. Appl. No. 11/945,183, (Feb. 23, 2011), 7 pages.
"Non-Final Office Action", U.S. Appl. No. 12/540,753, (Apr. 5, 2012), 14 pages.
"Notice of Allowance", U.S. Appl. No. 12/540,753, (Aug. 27, 2012), 5 pages.

* cited by examiner

*Primary Examiner* — Dang Ton
*Assistant Examiner* — Robert M Morlan

(57) ABSTRACT

In the various embodiments, decoders, methods, systems and devices exploit state information associated with transmitted packets to facilitate decoding operations. Specifically, in at least some embodiments, packets are received by a receiver. If the packet is unable to be decoded because of corruption, state information associated with that packet is buffered at the receiver and used for subsequent decoding. A retransmitted packet is then received, checked for corruption and, if not corrupted, is decoded leveraging the previously-buffered state information associated with the corrupted packet. In an event that one or more retransmitted packets are corrupted, this process can be repeated a number of times.

22 Claims, 9 Drawing Sheets

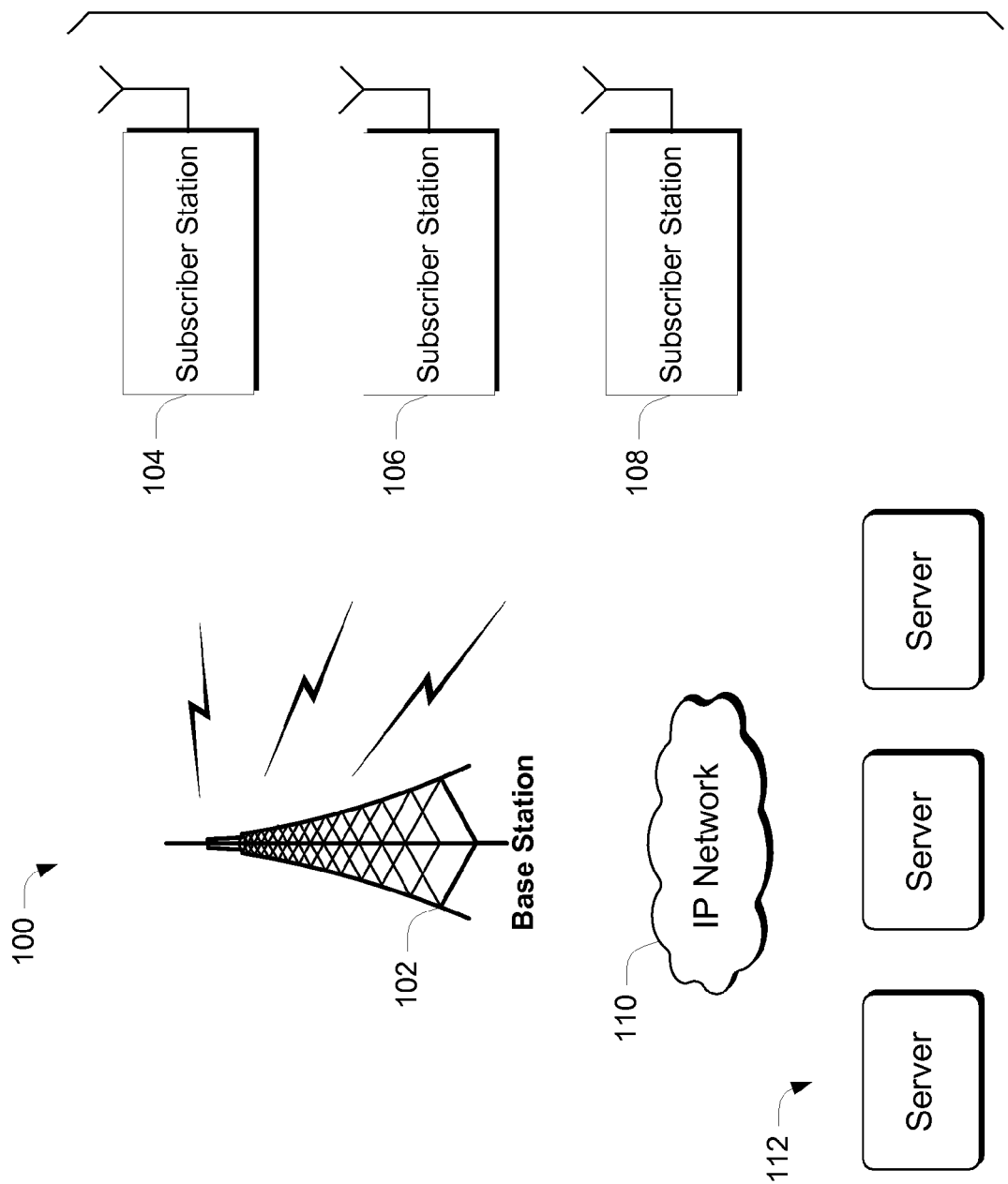

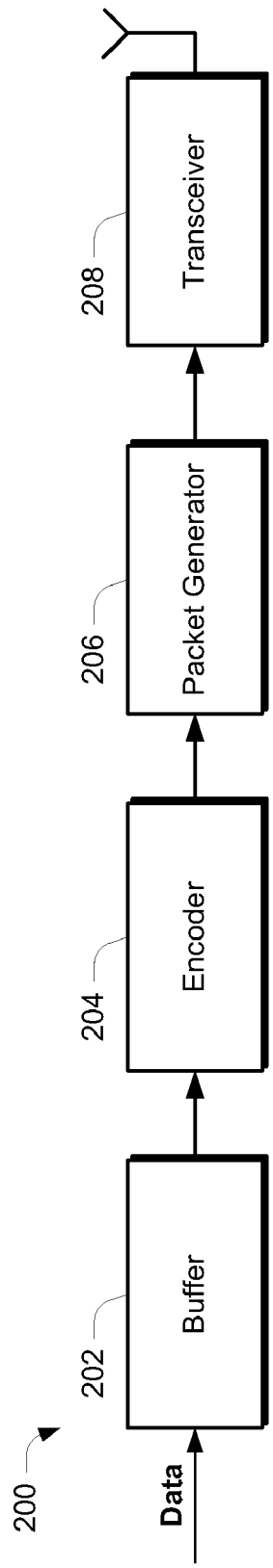
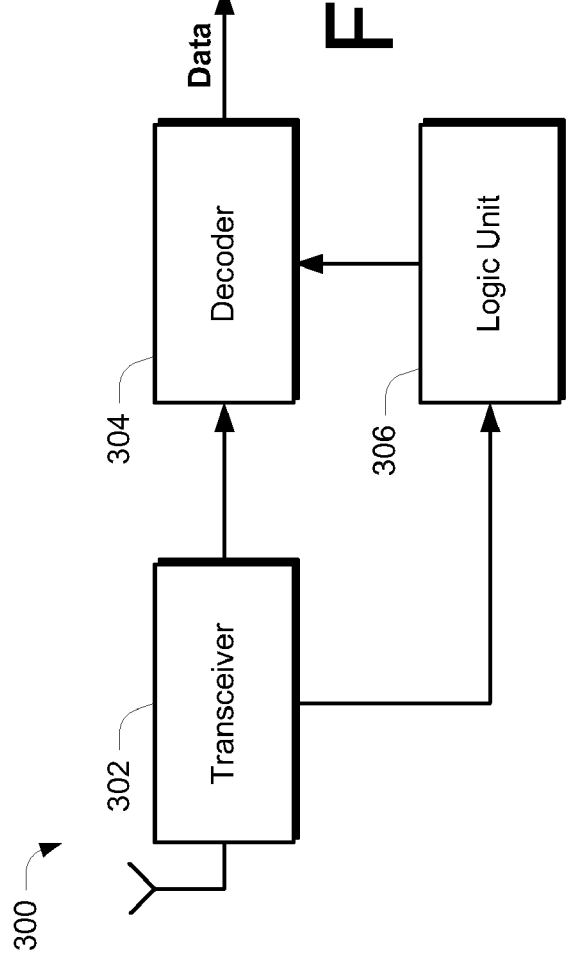

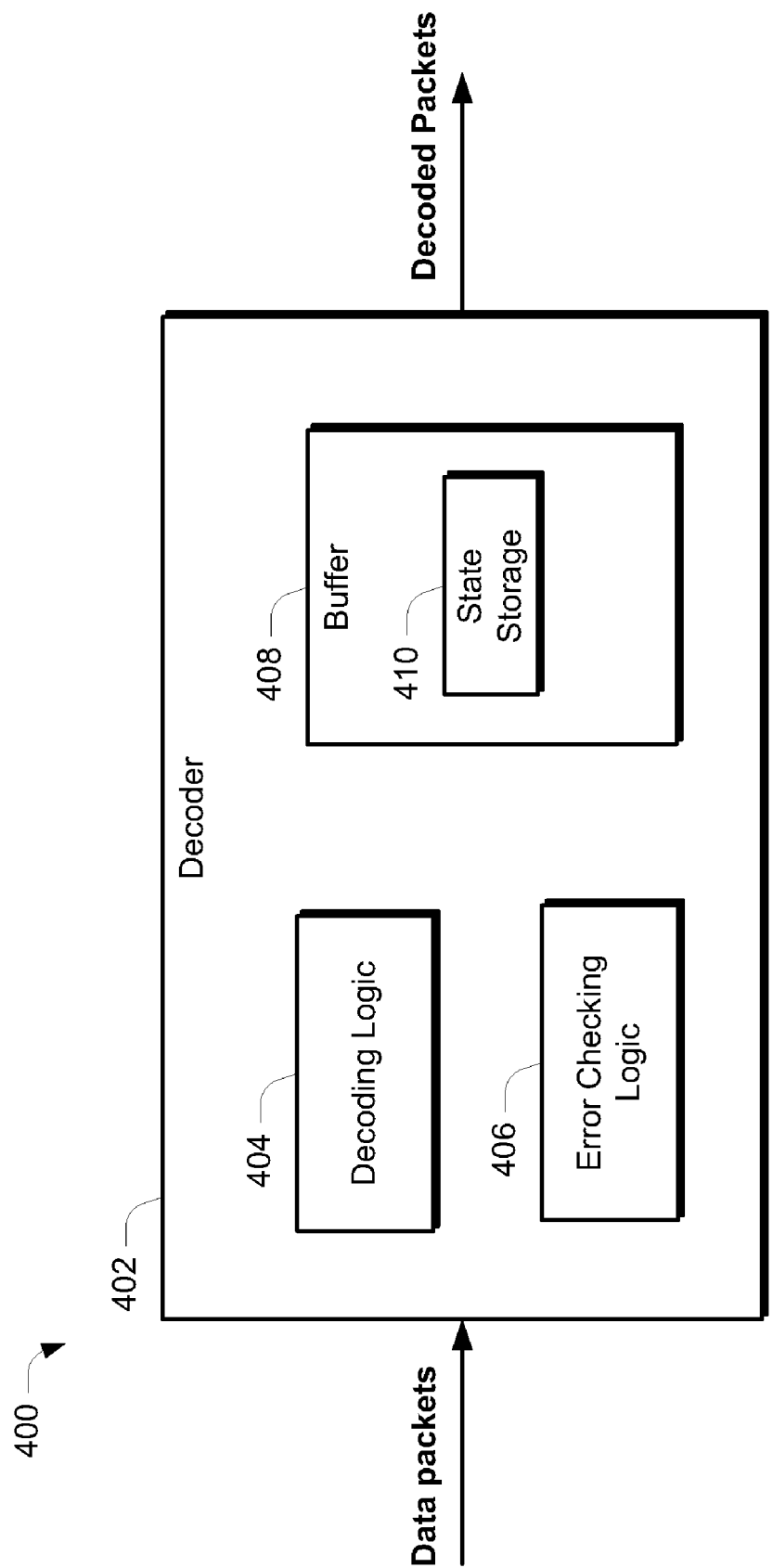

USE OF PREVIOUSLY BUFFERED STATE INFORMATION TO DECODE IN AN HYBRID AUTOMATIC REPEAT REQUEST (H-ARQ) TRANSMISSION MODE

RELATED APPLICATIONS

This application claims priority to U.S. Provisional Application Ser. No. 60/867,317, filed on Nov. 27, 2006, the disclosure of which is incorporated by reference herein.

BACKGROUND

Transmitting digital data over wireless connections can sometimes include transmitting data that has been corrupted in some way. Such corruption can come in the form of or be caused by noise in the link or channel, by interference from other transmissions, or by other factors. This problem can be exacerbated in systems that transmit data at high data rates. To deal with corruption issues, some transmission systems employ hybrid automatic repeat request (ARQ) or H-ARQ schemes. Such schemes provide an opportunity for data that has been corrupted to be retransmitted when such corruption has been detected by a receiver.

In H-ARQ schemes, a receiver that has received corrupted packets has an opportunity to receive a retransmission of the packets that have been corrupted. Once the retransmitted packets have been received, the receiver can combine the newly-received packets with the previously corrupted packets in an attempt to decode the packets to find an accurate representation of those packets. Thus, coded bits corresponding to a corrupted packet are stored and combined with coded bits from a subsequently received corresponding packet in an attempt to increase the likelihood that the packet can be correctly decoded.

Use of H-ARQ schemes can provide signal sensitivity gain through this combination mechanism. This can, in turn, enhance a system's throughput in a multi-cell environment.

SUMMARY

This Summary is provided to introduce subject matter that is further described below in the Detailed Description and Drawings. Accordingly, the Summary should not be considered to describe essential features nor used to limit the scope of the claimed subject matter.

In one or more embodiments, a decoder comprises error checking logic to ascertain whether one or more transmitted packets have been corrupted. A buffer is configured to store state information associated with packets that are received by the decoder. Decoding logic is operatively associated with the error checking logic and the buffer. The decoding logic is configured to receive a packet in an hybrid automatic repeat request (H-ARQ) mode and, for a retransmitted packet, the decoding logic reads buffered state information, buffered in the buffer and associated with a previously-transmitted packet, and uses the buffered state information to attempt to decode the retransmitted packet.

In accordance with another embodiment, a method comprises receiving a packet transmitted in an hybrid automatic repeat request (H-ARQ) mode. For a retransmitted packet, the method reads buffered state information associated with a previously-transmitted packet and uses the buffered state information to attempt to decode the retransmitted packet.

BRIEF DESCRIPTION OF THE DRAWINGS

The same numbers are used throughout the drawings to reference like features.

FIG. 1 illustrates a communication system in accordance with one or more embodiments.

FIG. 2 illustrates a transmitter in accordance with one or more embodiments.

FIG. 3 illustrates a receiver in accordance with one or more embodiments.

FIG. 4 illustrates an example system in accordance with one embodiment.

DETAILED DESCRIPTION

Overview

Figure 5:
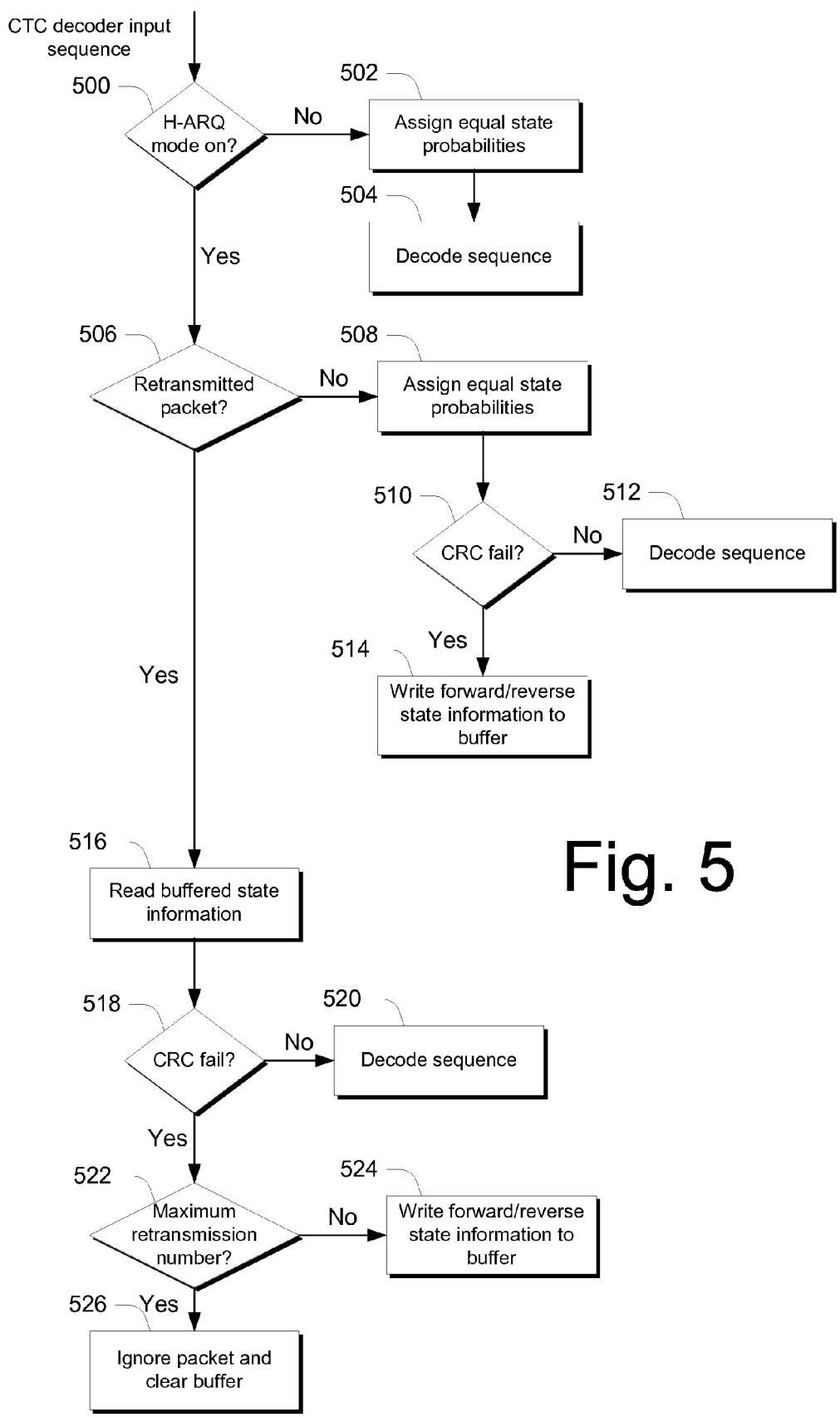
FIG. 5 is a flow diagram that describes a method in accordance with one embodiment.

In the various embodiments, decoders, methods, systems and devices exploit state information associated with transmitted packets to facilitate decoding operations. Specifically, in at least some embodiments, packets are received by a receiver. If the packet is unable to be decoded because of corruption, state information associated with that packet is buffered at the receiver and used for subsequent decoding. A retransmitted packet is then received, checked for corruption and, if not corrupted, is decoded leveraging the previously-buffered state information associated with the corrupted packet. If retransmitted packets are corrupted, this process can be repeated.

For example, in at least some embodiments, for a soft decision iterative tail biting (non-zero padding encoder) decoder, its starting decoding state is unknown at the decoder side. Due to this unknown starting state information at the decoder side, the decoding process starts with the same probability for all the trellis nodes (states) in the normal mode operation. However, in the H-ARQ operation, previously received packet's iterated forward and backward state probability can be exploited for determining the starting trellis state and efficient reverse metric calculation at the subsequent packet operation. For example, starting state can be determined by selecting the highest probability state and reverse metric calculations can be employed by using the buffered state probability information. For the soft decision iterative decoder, one iteration process is comprised of forward and backward metric value (state likelihood) calculation.

As a result, by using the previously iterated and merged likelihood state probability in the H-ARQ mode, iteration correction performance is improved and debasement can be reduced which requires less iteration operations (throughput gain achievement through the HW resource saving) with improved decoding performance. The trellis node state number is defined by the encoder's constituent memory size.

As noted above, various embodiments are employed in connection with systems that use the hybrid automatic repeat request (H-ARQ) transmission mode in compliance with the Institute of Electrical and Electronics Engineers (IEEE) Standard 802.16-2004, IEEE Standard 802.16e-2005, and IEEE Standard 802.16 Cor2/D4-2007.

In the discussion that follows, a section entitled "Operating Environment" is provided and describes one example operating environment in which one or more embodiments can be employed. It is to be appreciated and understood that this environment is provided for context and is not to be used to limit application of the claimed subject matter to one specific environment. Rather, the inventive principles can be employed in other environments in accord with the spirit and scope of the claimed subject matter. Following this, a section entitled "Example Transmitter" is provided followed by a section entitled "Example Receiver" each of which respectively describes a transmitter and a receiver that can be used in accordance with one or more embodiments. Following these sections, a section entitled "Implementation Example" describes but one implementation in accordance with one or more embodiments. A section entitled "Example Method" follows and describes an example method in accordance with one or more embodiments. Lastly, a section entitled "Example Receiver Environments" is provided and describes some examples of receiver environments that can utilize the principles described herein.

Operating Environment

FIG. 1 illustrates a communication system in accordance with one or more embodiments generally at 100. In the illustrated and described embodiments, communication system 100 utilizes an IEEE 802.16 communication system protocol and, more specifically, the IEEE 802.16d/e protocol. The IEEE 802.16 protocol can be used to provide Worldwide Interoperability for Microwave Access or WIMAX functionality operating in the frequency range from 10-66 GHz, as will be appreciated by the skilled artisan. WIMAX is typically used in a number of scenarios including, by way of example and not limitation, Voice over IP or "VoIP", TCP/IP, and with applications having different quality of service or QoS requirements. However, other embodiments can utilize communication system protocols other than the IEEE 802.16d/e protocol. Such other protocols can include, by way of example and not limitation, the IEEE Standard 802.20 (Mobile Broadband Wireless Access (MBWA) Working Group).

Communication system 100 includes, in this example, one or more base stations 102 and multiple subscriber stations 104, 106, and 108. Base stations can be connected to an IP network 110 via a gateway (not shown). The IP network can include various special and general purpose servers shown generally at 112. Elements within both the base stations and subscriber stations are configured with processors, memories, instruction sets and the like, that implement the functionality described in this document. Typically, communication that takes place within the system goes through base station 102. The base station is responsible for allocating bandwidth and can typically handle thousands of subscriber stations. In at least some embodiments, base station 102 is implemented as a WIMAX tower, which is similar in concept to a cell-phone tower. A WIMAX tower can provide coverage to a very large area, e.g., 8000 square kilometers.

Subscriber stations can include, by way of example and not limitation, subscriber stations such as those that are associated with residential and business customers. A subscriber station includes a receiver, such as a WIMAX receiver. The receiver and associated antenna(s) can be embodied in a small box or PCMCIA card, or can be embodied in some type of computing device such as a laptop computer, notebook computer, desktop computer, mobile device and/or a handheld computing device to name just a few. Of course, the receiver can be embodied in other types of computing devices without departing from the spirit and scope of the claimed subject matter.

Communications system 100 includes two types of communication links. A downlink is used for communication from the base station 102 to the subscriber stations 104, 106, and 108. An uplink is used for communication from the subscriber stations to base station 102.

Communication system 100 utilizes the base station 102 to communicate packets to the various subscriber stations. In one or more embodiments, packets represent either headers or payloads with or without CRC or combinations of those. More specifically, when individual subscriber stations boot up, each can register with the base station. The base station can serve to exchange messages with the subscriber stations located in a corresponding service cell, authenticate and register subscriber stations via one or more servers in the IP network, transmit service request messages from the subscriber stations to the IP network, and transmit packets from the IP network to the subscriber stations, and so on.

As noted above, due to various circumstances, packets communicated from the base station can sometimes become corrupted. In accordance with the embodiments described below, state information associated with the packets can be utilized to mitigate and/or cure packet corruption.

Example Transmitter

FIG. 2 illustrates a transmitter, such as that embodied at base station 102 (FIG. 1), generally at 200 in accordance with one or more embodiments. In this example, transmitter 200 includes a buffer 202, an encoder 204, a packet generator 206, and a transceiver 208 including one or more antennas.

Buffer 202 includes storage media such as random access memory for storing data that is to be transmitted to a receiver, such as one or more subscriber stations (not shown). Buffer 202 is coupled with encoder 204, which is configured to encode the buffer data in any suitable encoding scheme. In one or more embodiments, encoder 204 is implemented as a Convolutional Turbo Code (CTC) encoder. Other encoders can be used without departing from the spirit and scope of the claimed subject matter. Encoder 204 is responsible for generating both normal mode packets and H-ARQ modes packets that, in this embodiment, are compliant with the IEEE 802.16d/e protocol.

Encoder 204 is communicatively coupled with packet generator 206. The packet generator includes circuitry and logic that constructs data packets that are to be transmitted to various receivers. The packet generator is coupled with transceiver 208, which is configured to transmit the data packets to the various receivers, as will be understood by the skilled artisan.

Example Receiver

FIG. 3 illustrates a receiver, generally at 300, in accordance with one or more embodiments. The illustrated receiver represents a subscriber station, such as subscriber stations 104, 106, and 108 in FIG. 1. In this example, receiver 300 includes a transceiver 302, a decoder 304, and a logic unit 306.

In the illustrated and described embodiment, transceiver 302 is one that operates in compliance with one or more of the IEEE 802.16 standards, such as the IEEE 802.16d/e standards.

Transceiver 302 is configured to receive transmitted packets from a transmitter, such as that shown in FIG. 2. Transceiver 302 is communicatively coupled to decoder 304 and provides received packets to the decoder for decoding in accordance with the principles described below. In the illustrated and described embodiment, decoder 304 is implemented as a Convolutional Turbo Code (CTC) decoder. It is to be appreciated and understood that other decoders can be used without departing from the spirit and scope of the claimed subject matter.

Logic unit 306 is configured with a microprocessor controller and logic to facilitate decoding operations. Decoder 304 outputs data that has been decoded in accordance with the principles described below.

In operation, transceiver 302 receives transmissions in both normal and H-ARQ transmission modes, from a transmitter and provides transmitted data, such as data packets, to decoder 304 for decoding. In H-ARQ transmission mode, decoder 304 first attempts to decode a received packet. If the packet is not corrupted and decoding is successful, an acknowledgment message or ACK is sent by transceiver 302 to the transmitter. If, on the other hand, decoding fails for some reason, a "not acknowledged" message or NAK is sent back to the transmitter which, in this instance, is the base station. In response, the transmitter will send another H-ARQ transmission. The transmitter may continue to send H-ARQ transmissions until receiver 300 successfully decodes a packet and sends an acknowledgment.

In accordance with the described embodiment, decoder 304 is configured to exploit a retransmission packet's state information to facilitate decoding operation in the H-ARQ transmission mode. But one example of how this can be done is provided just below.

Implementation Example

FIG. 4 illustrates an example system in accordance with one embodiment generally at 400. In this example, system 400 includes a decoder 402 embodied as a CTC decoder that operates utilizing CTC principles as will be understood by the skilled artisan. Decoder 402 includes, in this example, decoding logic 404, error checking logic 406, and a buffer 408. Buffer 408 includes state storage 410 that is utilized to store forward and reverse state information associated with packets that are received in the H-ARQ transmission mode. In one or more embodiments, for iterative decoding operation, one iteration is composed of forward (received decoding sequence direction) and reverse state's metric calculation. For example, for the CTC iterative decoder case, forward metric calculation corresponds to the alpha calculation and reverse metric calculation corresponds to the beta calculation.

The decoder 402 can be implemented using any suitable hardware, software, firmware, or combination thereof. Decoding logic 404 is configured to receive data packets and attempt to decode the packets using decoding techniques described below. Decoding logic 404 utilizes error checking logic 406 to ascertain whether a particular packet or packets has or have been corrupted. Any suitable variety of error checking techniques may be used. In at least some embodiments, error checking logic 406 includes cyclic redundancy check (CRC) logic which uses CRC data included with a packet to ascertain whether the packet is corrupted.

If a packet has not been corrupted, normal decoding operations with respect to the packet take place. On the other hand, in an event a packet has been corrupted, decoding logic 404 utilizes buffer 408 to store state information associated with the packet in state storage 410. Subsequently received packets associated with the corrupted packet are then received and the state information that is stored in state storage 410 is utilized in iterative attempts to decode the packet.

In conventional CTC decoder operations, the decoder does not know starting state values associated with individual packets. Consequently, the decoding process in the conventional CTC decoders starts by using the same probability for individual trellis states. For example, in current CTC operations, there are eight trellis states. Each state is assigned a ⅛ probability because the starting state values are not known.

In the illustrated and described embodiment, however, previously calculated and buffered state information can be exploited for newly received packets in the decoding operation. Specifically, previously calculated, iterated state information at a previous frame may be stored in a buffer, such as buffer 408. This state information may be used as a starting state probability for a next received packet in the H-ARQ transmission mode. As such, reliable decoder correction performance per iteration and better decoding performance may be achieved. This is particularly the case for circumstances in which short H-ARQ packets are transmitted, as such will provide less debased decoding performance in fading channels and performance benefits for the same iteration number.

Example Method

FIG. 5 is a flow diagram that describes a method in accordance with one embodiment. The method can be implemented in connection with any suitable hardware, software, firmware, or combination thereof. In at least some embodiments, the method can be implemented, at least in part, by a decoder such as that shown and described in FIG. 4 that is part of a system such as that shown and described in FIG. 3.

The method determines, at 500, whether the H-ARQ transmission mode is on responsive to receiving a CTC decoder input sequence. The input sequence can comprise one or more packets. If the H-ARQ transmission mode is not on, then equal state probabilities are assigned, at 502, to a packet and the sequence is decoded at 504. Decoding can take place using a variety of decoding techniques.

If, on the other hand, the H-ARQ transmission mode is determined to be on, then a determination is made at 506 as to whether a packet is a retransmitted packet. If the packet is not a retransmitted packet, then equal state probabilities are assigned to the packet at 508. Next, a check is performed at 510 to ascertain whether the packet has been corrupted. In the illustrated and described embodiment, this check is performed as a cyclic redundancy check or CRC. If the packet has not been corrupted, the sequence is decoded at 512. If, on the other hand, the packet has been corrupted as by failing the cyclic redundancy check, state information such as forward/reverse state information is written into a buffer at 514.

Returning to 506, if the packet is determined to be a retransmitted packet, buffered state information is read from the buffer at 516 and a check is performed at 518 to ascertain whether the packet has been corrupted. If the packet has not been corrupted, then the sequence is decoded at 520 using the buffered state information. Recall that the buffered state information that is utilized is that of a previously-transmitted corrupt packet. If, on the other hand, the received packet has been corrupted as by failing the CRC check at 518, a determination is made as to whether a maximum retransmission number has been reached at 522.

If at 522 the maximum retransmission number has not been reached, then forward/reverse state information is written to the buffer at 524 and the method can return to 506. If, on the other hand, the maximum retransmission number has been reached at 522, the packet is ignored and the buffer is cleared at 526.

Example Receiver Environments

Referring now to FIGS. 6-12, various example implementations of receiver environments are shown. The various receiver environments can utilize the techniques described above.

Figure 6:
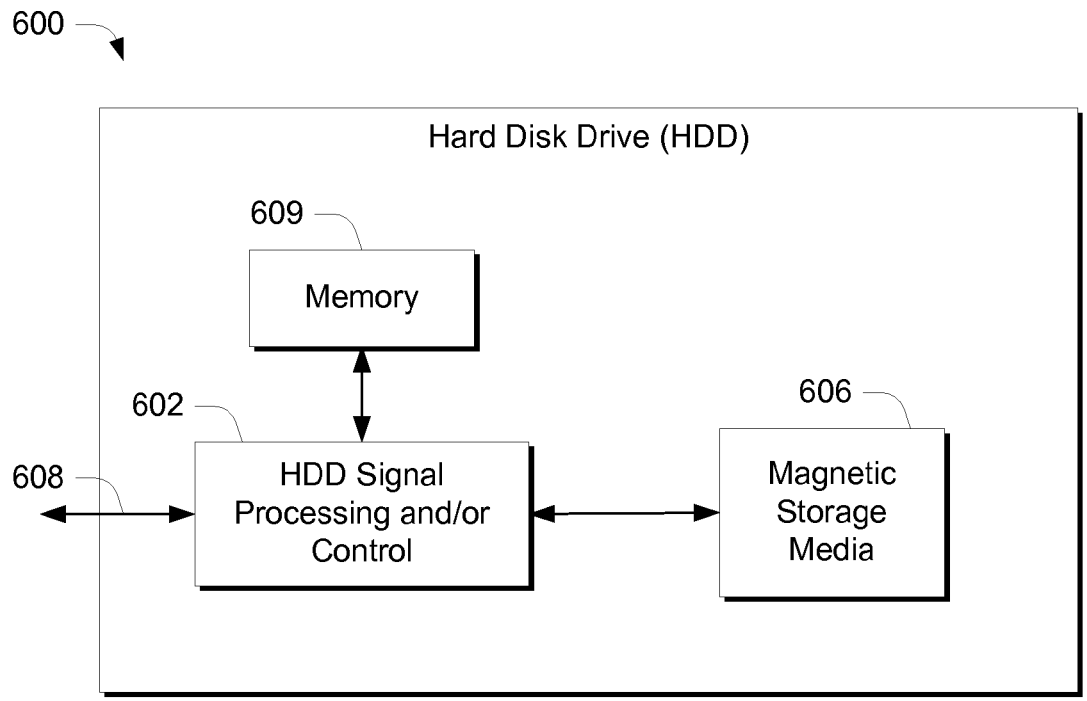
FIGS. 6-13 illustrate various implementations of example embodiments.

Referring to FIG. 6, a receiver may be embodied in a hard disk drive (HDD) 600 and may compromise part of its signal processing and/or control circuits which are generally identified at 602. In some implementations, signal processing and/or control circuit 602 and/or other circuits (not shown) in HDD 600 may process data, perform coding, decoding and/or encryption, perform calculations, and/or format data that is output to and/or received from a magnetic storage medium 606.

HDD 600 may communicate with a host device (not shown) such as a computer, mobile computing devices such as personal digital assistants, cellular phones, media or MP3 players and the like, and/or other devices via one or more wired or wireless communication links 608. HDD 600 may be connected to memory 609, such as random access memory (RAM), a low-latency nonvolatile memory such as flash memory, read only memory (ROM) and/or other suitable electronic data storage.

Figure 7:
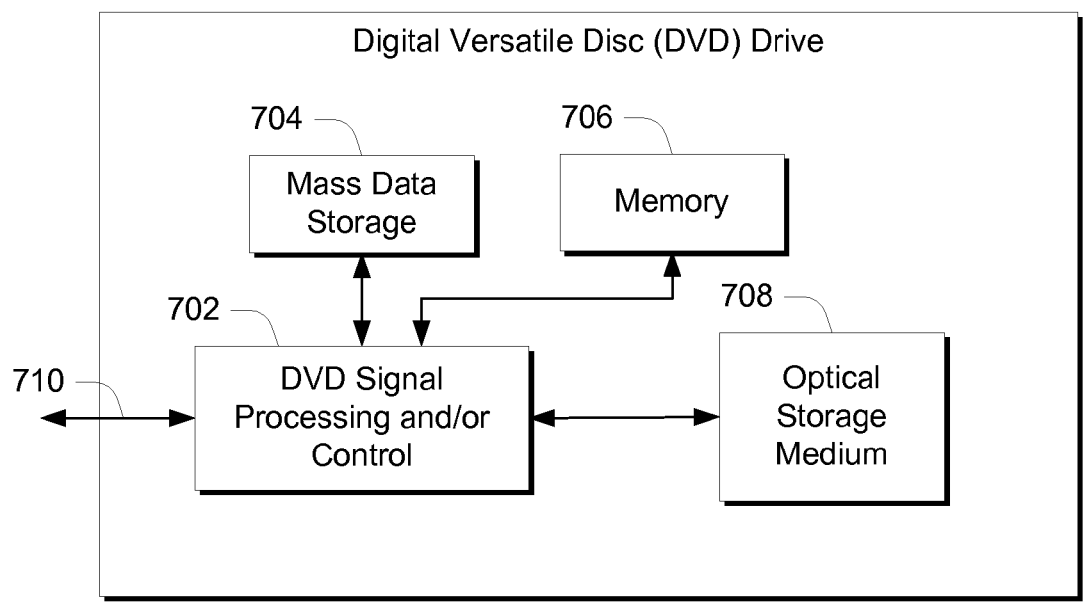

Referring now to FIG. 7, a receiver may be embodied in a digital versatile disc (DVD) drive 700 and may comprise part of its signal processing and/or control circuits, which are generally identified at 702. DVD drive 700 includes mass data storage 704, memory 706 and optical storage medium 708. Signal processing and/or control circuit 702 and/or other circuits (not shown) in DVD drive 700 may process data, perform coding, decoding and/or encryption, perform calculations, and/or format data that is read from and/or data written to an optical storage medium 708. In some implementations, signal processing and/or control circuit 702 and/or other circuits (not shown) in DVD drive 700 can also perform other functions such as encoding and/or decoding and/or any other signal processing functions associated with a DVD drive.

DVD drive 700 may communicate with an output device (not shown) such as a computer, television, or other device via one or more wired or wireless communication links 710. DVD drive 700 includes mass data storage 704 that stores data in a nonvolatile manner. Mass data storage 704 may include a hard disk drive (HDD) such as that shown in FIG. 6. The HDD may be a mini HDD that includes one or more platters having a diameter that is smaller than approximately 1.8". DVD drive 700 may be connected to memory 706, such as RAM, ROM, low latency nonvolatile memory such as flash memory, and/or other suitable electronic data storage.

Figure 8:
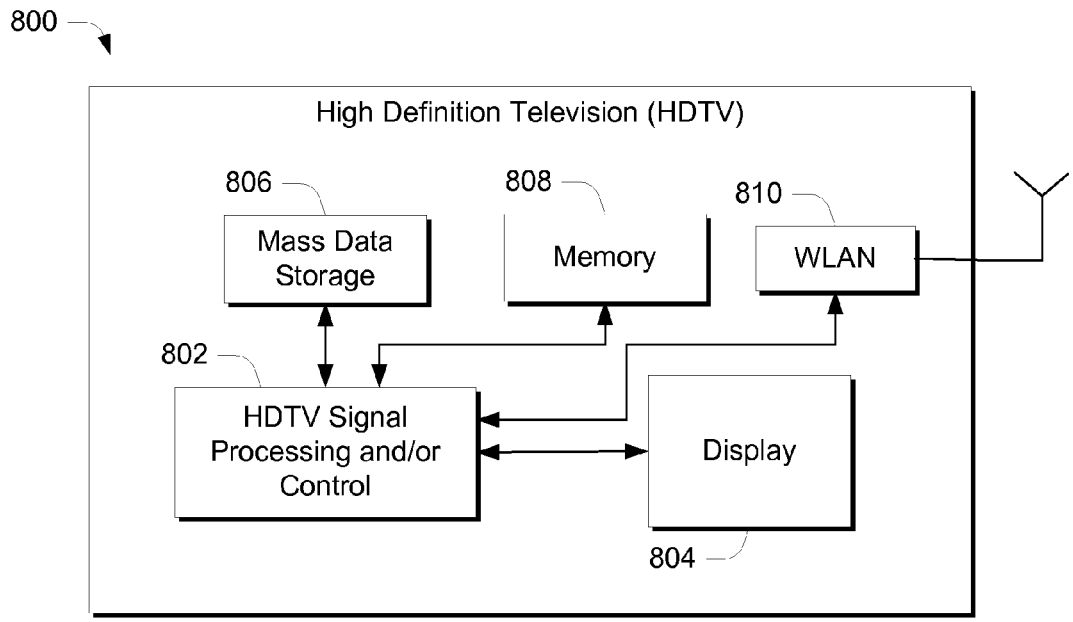

Referring now to FIG. 8, a receiver may be embodied in a high definition television (HDTV) 800 and may be implemented in either or both signal processing and/or control circuits, which are generally identified at 802, a wireless local area network (WLAN) interface 810 and/or mass data storage 806 of the HDTV 800. HDTV 800 receives HDTV input signals in either a wired or wireless format and generates HDTV output signals for a display 804. In some implementations, signal processing circuit and/or control circuit 802 and/or other circuits (not shown) of HDTV 800 may process data, perform coding, decoding and/or encryption, perform calculations, format data, and/or perform any other type of HDTV processing that may be required.

HDTV 800 may include mass data storage 806, which stores data in a nonvolatile manner such as optical and/or magnetic storage devices. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". HDTV 800 may also include memory 808 such as RAM, ROM, low latency nonvolatile memory such as flash memory and/or other suitable electronic data storage. HDTV 800 also may support connections with a WLAN via a WLAN network interface 810.

Figure 9:
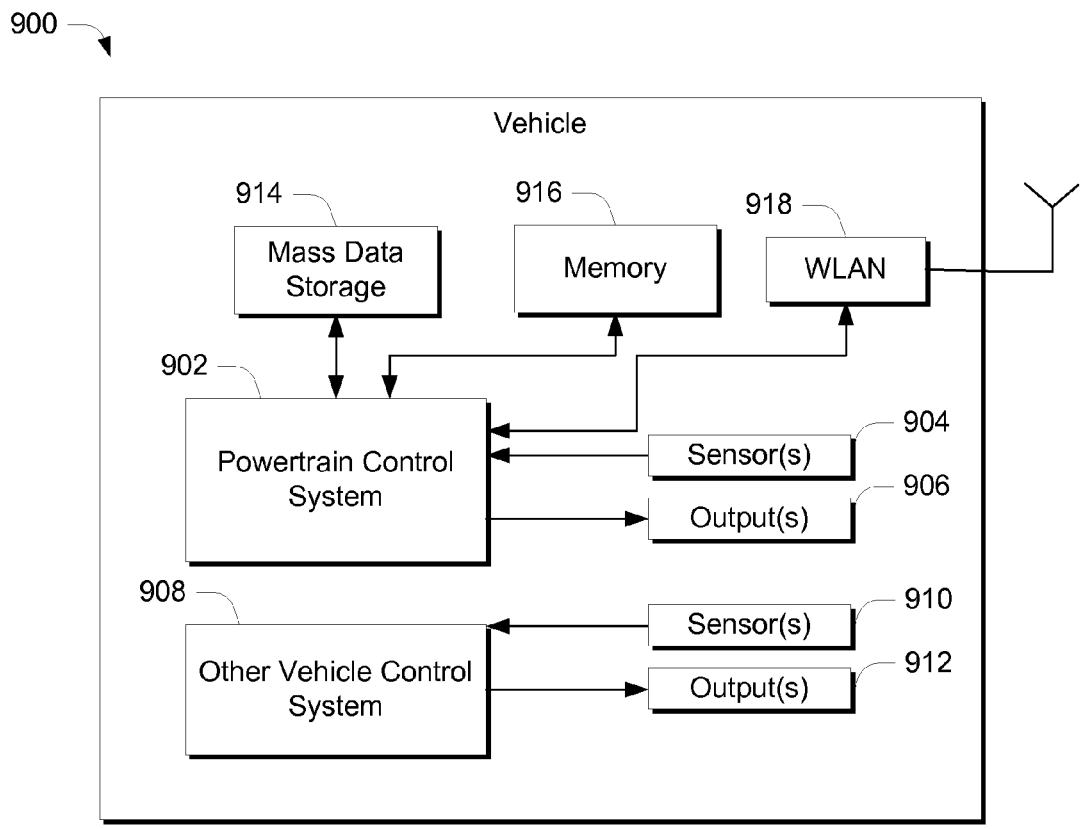

Referring now to FIG. 9, a receiver may be implemented as part of a communication system of a vehicle 900, a WLAN interface 918 and/or mass data storage 914 of the vehicle control system. In some implementations, a powertrain control system 902 receives inputs from one or more sensors 904 such as temperature sensors, pressure sensors, rotational sensors, airflow sensors, and/or any other suitable sensors that generate one or more output control signals 906, such as engine operating parameters, transmission operating parameters, and/or other control signals.

A receiver can be embodied in other control systems 908 of vehicle 900. Control system 908 may likewise receive signals from input sensors 910 and/or output control signals 912 to one or more output devices. In some implementations, control system 908 may be part of an anti-lock braking system (ABS), a navigation system, a telematics system, a vehicle telematics system, a lane departure system, an adaptive cruise control system, a vehicle entertainment system such as a stereo, DVD, compact disc, and the like. Still other implementations are contemplated.

Powertrain control system 902 may include mass data storage 914 that stores data in a nonvolatile manner. Mass data storage 914 may include optical and/or magnetic storage devices for example hard disk drives HDD and/or DVDs. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". Powertrain control system 902 may be connected to memory 916 such as RAM, ROM, low latency nonvolatile memory such as flash memory, and/or other suitable electronic data storage. Powertrain control system 902 also may support connections with a WLAN via a WLAN network interface 918. The control system 908 may also include mass data storage, memory, and/or a WLAN interface (all not shown).

Figure 10:
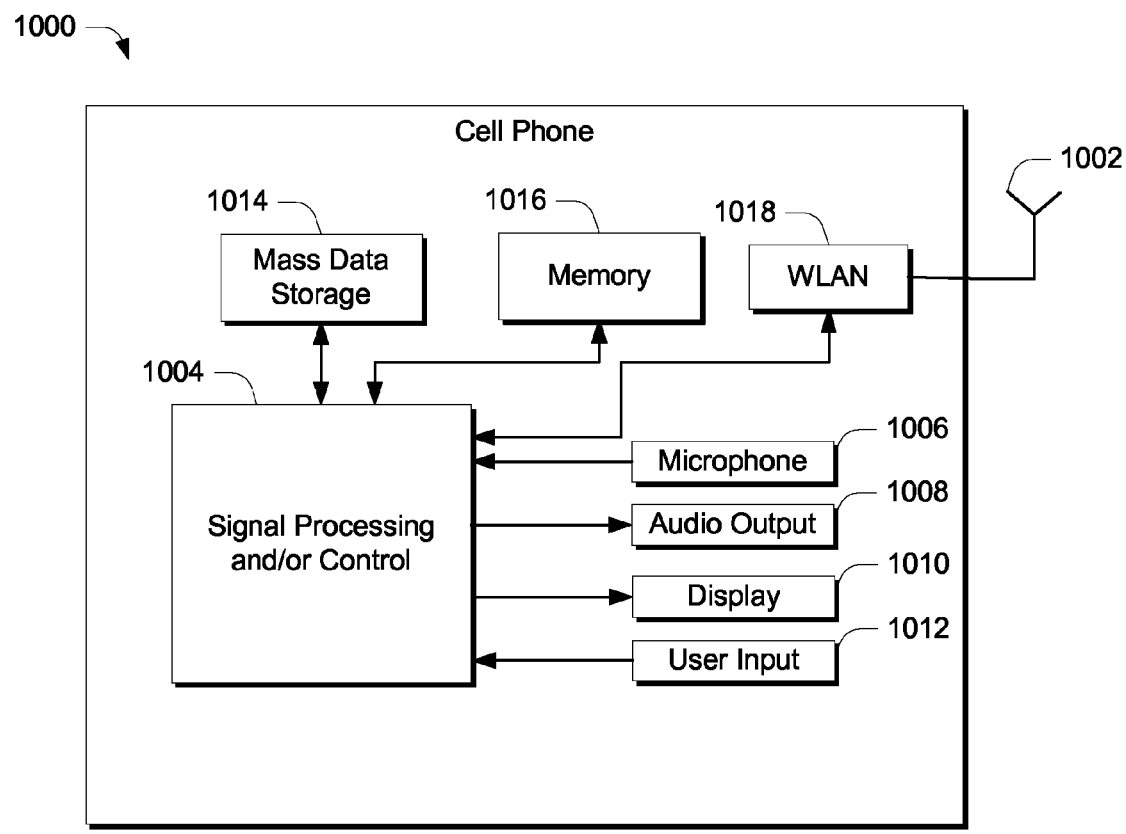

Referring now to FIG. 10, the receiver may be embodied in a cellular phone 1000 that may include a cellular antenna 1002. The receiver may be implemented in connection with either or both signal processing and/or control circuits, which are generally identified in at 1004, a WLAN interface 1018, and/or mass data storage of the cellular phone 1000. In some implementations, cellular phone 1000 includes a microphone 1006, an audio output 1008 such as a speaker and/or audio output jack, a display 1010 and/or an input device 1012 such as a keypad, pointing device, voice actuation, and/or other input device. Signal processing and/or control circuits 1004 and/or other circuits (not shown) in cellular phone 1000 may process data, perform coding, decoding and/or encryption, perform calculations, format data, and/or perform other cellular phone functions.

Cellular phone 1000 may include mass data storage 1014, which stores data in a nonvolatile manner such as optical and/or magnetic storage devices for example hard disk drives HDD and/or DVDs. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". Cellular phone 1000 may be connected to memory 1016 such as RAM, ROM, low latency nonvolatile memory such as flash memory, and/or other suitable electronic data storage. Cellular phone 1000 also may support connections with a WLAN via a WLAN network interface 1018.

Figure 11:
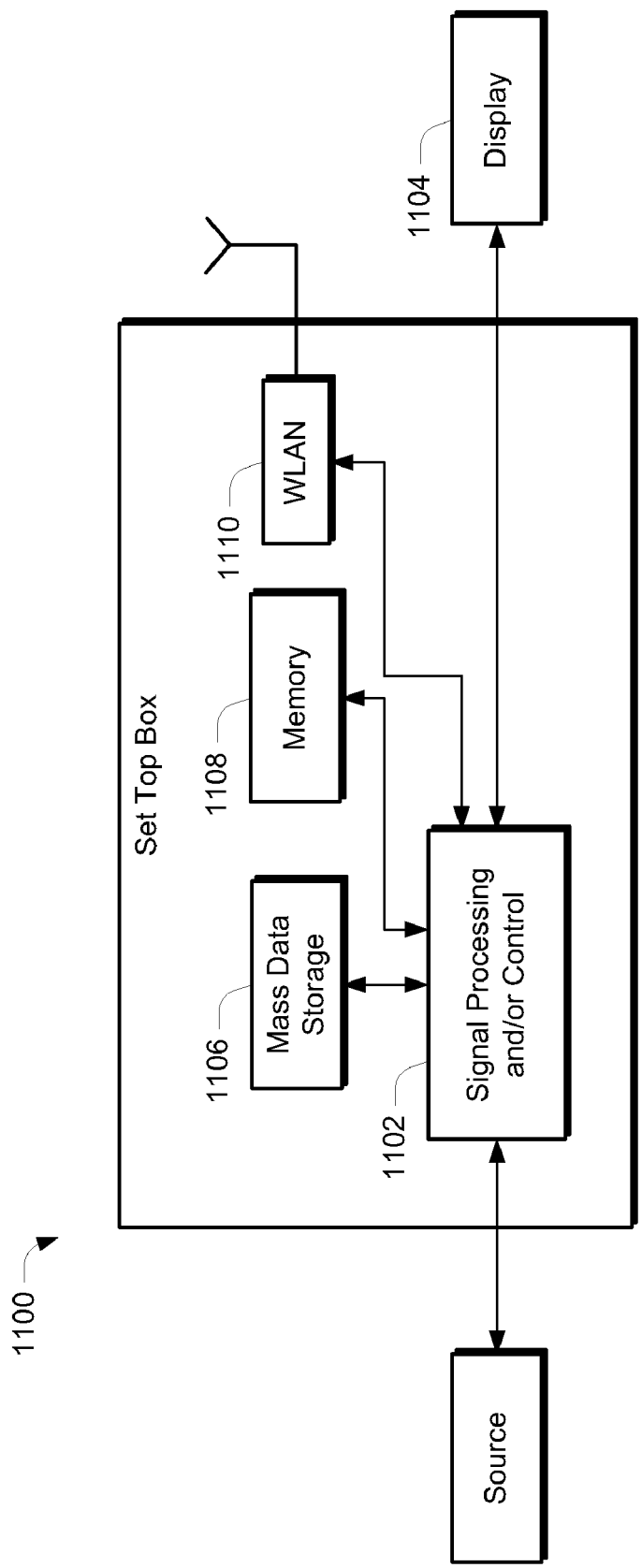

Referring now to FIG. 11, a receiver may be embodied in a set top box 1100, which may be implemented by either or both signal processing and/or control circuits, which are generally identified at 1102, a WLAN interface 1110, and/or mass data storage 1106 of the set top box 1100. Set top box 1100 receives signals from a source such as a broadband source and outputs standard and/or high definition audio/video signals suitable for a display 1104 such as a television and/or monitor and/or other video and/or audio output devices. Signal processing and/or control circuits 1102 and/or other circuits (not shown) of the set top box 1100 may process data, perform coding, decoding and/or encryption, perform calculations, format data, and/or perform any other set top box function.

Set top box 1100 may include a mass data storage 1106 that stores data in a nonvolatile manner. Mass data storage 1106 may include optical and/or magnetic storage devices for example hard disk drives HDD and/or DVDs. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". Set top box 1100 may be connected to memory 1108 such as RAM, ROM, low latency nonvolatile memory such as flash memory and/or other suitable electronic data storage. Set top box 1100 also may support connections with a WLAN via a WLAN network interface 1110.

Figure 12:
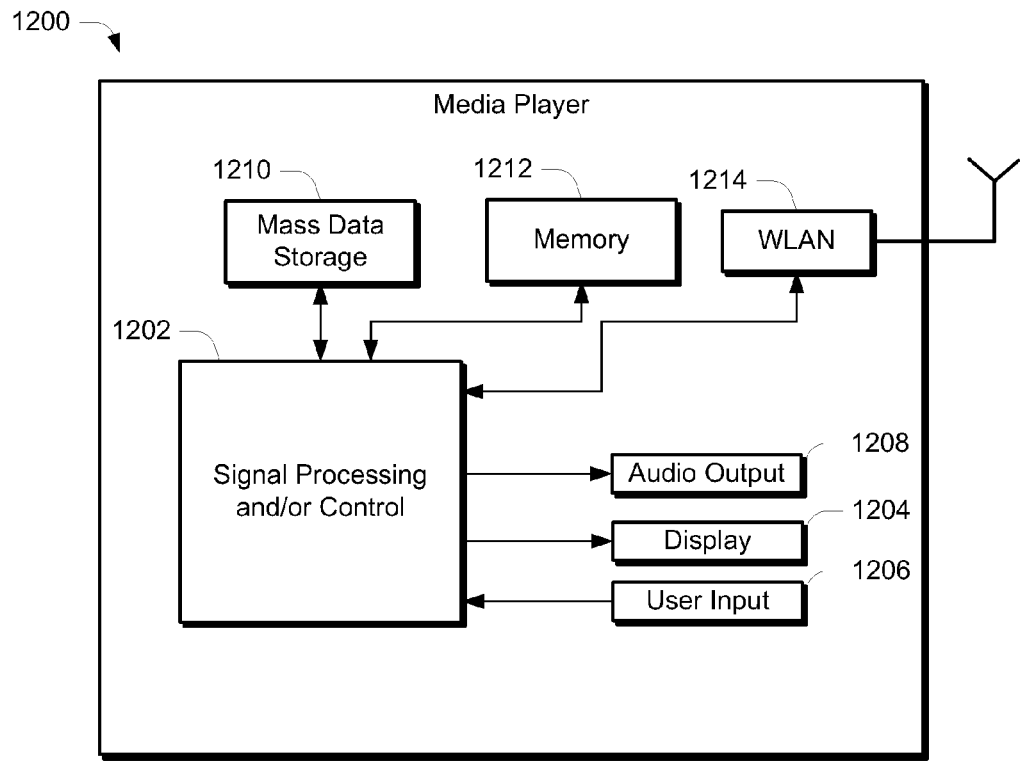

Referring now to FIG. 12, a receiver may be embodied in a media player 1200 and may be implemented in connection with either or both signal processing and/or control circuits, which are generally identified at 1202, a WLAN interface 1214, and/or mass data storage 1210 of the media player 1200. In some implementations, media player 1200 includes a display 1204 and/or a user input 1206 such as a keypad, touchpad, and the like. In some implementations, media player 1200 may employ a graphical user interface (GUI) that typically employs menus, drop down menus, icons, and/or a point-and-click interface via display 1204 and/or user input 1206. Media player 1200 further includes an audio output 1208 such as a speaker and/or audio output jack. Signal processing and/or control circuits 1202 and/or other circuits (not shown) of media player 1200 may process data, perform coding, decoding and/or encryption, perform calculations, format data, and/or perform any other media player function.

Media player 1200 may include mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". Media player 1200 may be connected to memory 1212 such as RAM, ROM, low latency nonvolatile memory such as flash memory, and/or other suitable electronic data storage. Media player 1200 also may support connections with a WLAN via a WLAN network interface 1214.

Figure 13:
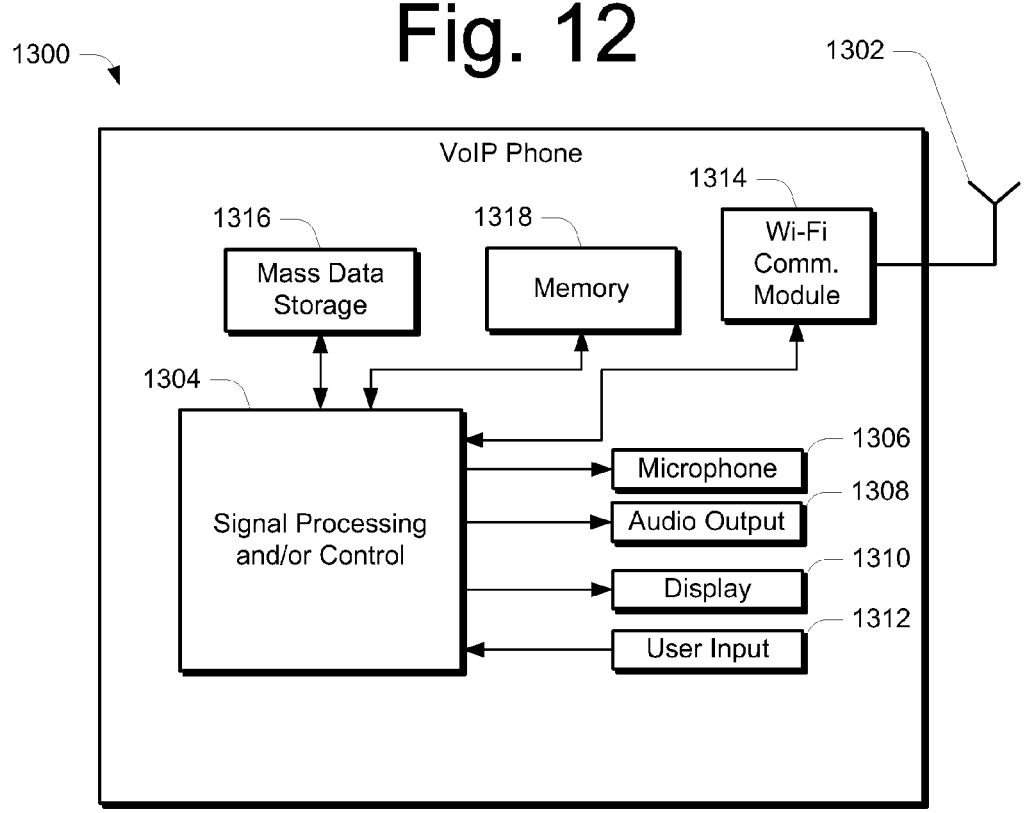

Referring to FIG. 13, a receiver may be embodied in connection with a Voice over Internet Protocol (VoIP) phone 1300 that may include an antenna 1302 or, alternately or additionally, in connection with a VoIP box that enables a conventional telephone to be plugged in and utilized with VoIP technology. The receiver may be implemented in connection with either or both signal processing and/or control circuits, which are generally identified at 1304, a wireless interface 1314, and/or mass data storage 1316 of the VoIP phone 1300. In some implementations, VoIP phone 1300 includes, in part, a microphone 1306, an audio output 1308 such as a speaker and/or audio output jack, a display monitor 1310, an input device 1312 such as a keypad, pointing device, voice actuation, and/or other input devices, and a Wireless Fidelity (Wi-Fi) communication module 1314. Signal processing and/or control circuits 1304 and/or other circuits (not shown) in VoIP phone 1300 may process data, perform coding, decoding and/or encryption, perform calculations, format data, and/or perform other VoIP phone functions.

VoIP phone 1300 may include mass data storage 1316 that stores data in a nonvolatile manner such as optical and/or magnetic storage devices, for example hard disk drives HDD and/or DVDs. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". VoIP phone 1300 may be connected to memory 1318, which may be a RAM, ROM, low latency nonvolatile memory such as flash memory, and/or other suitable electronic data storage. VoIP phone 1300 is configured to establish communications link with a VoIP network (not shown) via Wi-Fi communication module 1314. Still other implementations in addition to those described above are contemplated.

CONCLUSION

In the various embodiments, decoders, methods, systems and devices exploit state information associated with transmitted packets to facilitate decoding operations. Specifically, in at least some embodiments, packets are received by a receiver. If the packet is unable to be decoded because of corruption, state information associated with that packet is buffered at the receiver and used for subsequent decoding. A retransmitted packet is then received, checked for corruption and, if not corrupted, is decoded leveraging the previously-buffered state information associated with the corrupted packet. In an event that one or more retransmitted packets are corrupted, this process can be repeated a number of times. Using the above-described approach, correction performance per iteration can be enhanced and debasement can be stabilized within several iterations. As a result, additional performance gain can be achieved.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A decoder comprising:
   error checking logic to ascertain whether one or more received packets have been corrupted;
   a buffer operable to store forward or reverse state information associated with packets that are received by the decoder; and
   convolutional-turbo-code (CTC) decoding logic operatively associated with the error checking logic and the buffer, the CTC decoding logic having an unknown starting state in which all trellis states of the CTC decoding logic have a same initial probability, and operable to:
   receive a packet in an hybrid automatic repeat request (H-ARQ) transmission mode and determine whether the packet is a retransmitted packet;
   for the retransmitted packet, read buffered forward or reverse state information stored in the buffer and associated with a previously transmitted packet, at least a portion of the previously-transmitted packet corrupted or not decodable; and assign, based on the buffered forward or reverse state information, a starting probability to one of the trellis states of the CTC decoding logic to attempt to decode the retransmitted packet, the assigned starting probability different from the initial probability.

2. The decoder of claim 1, wherein the CTC decoding logic is further operable to perform a check on the retransmitted packet to ascertain if the retransmitted packet has been corrupted and, in an event the retransmitted packet has been corrupted, write the forward or reverse state information associated with the retransmitted packet to the buffer for use in subsequent decoding attempts.

3. The decoder of claim 2, wherein the CTC decoding logic is further operable to, prior to writing the forward or reverse state information, determine whether a maximum retransmission number has been reached and, if so, ignore the retransmitted packet and clear the buffer.

4. The decoder of claim 3, wherein the CTC decoding logic is further operable to write the forward or reverse state information if the maximum retransmission number has not been reached.

5. The decoder of claim 1, wherein the CTC decoding logic is further operable to:
 determine whether the H-ARQ transmission mode is on responsive to receiving an input sequence; and
 if the H-ARQ transmission mode is not on, assign forward or reverse state probabilities to one or more packets associated with the input sequence and attempt to decode the input sequence.

6. The decoder of claim 1, wherein the CTC decoding logic is further operable to, for the packet that is not a retransmitted packet, assign forward or reverse state probabilities to the packet, perform a check to ascertain whether the packet has been corrupted, and if the packet has been corrupted, write forward or reverse state information associated with the packet to the buffer for use in subsequent decoding attempts.

7. The decoder of claim 1, wherein the packet is compliant with the Institute of Electrical and Electronics Engineers (IEEE) 802.16 Cor2/D42007 standard.

8. The decoder of claim 1, wherein the buffered forward or reverse state information comprises an alpha calculation and a beta calculation associated with the previously-transmitted packet.

9. The decoder of claim 1, wherein the one or more packets are short-size CTC packets.

10. The decoder of claim 1, wherein the buffered forward or reverse state information stored in the buffer is iteratively calculated by the decoder based on the previously-transmitted packet.

11. A method comprising:
 receiving a packet transmitted in an hybrid automatic repeat request (HARQ) transmission mode;
 for a retransmitted packet, reading buffered forward or reverse state information associated with a previously-transmitted packet, at least a portion of the previously-transmitted packet corrupted or not decodable; and
 assigning, based on the buffered forward or reverse state information, a starting probability to a trellis state of a convolutional-turbo-code (CTC) decoder having an unknown starting state to attempt to decode the retransmitted packet, the unknown starting state being a state in which all trellis states of the CTC decoder have a same initial probability that is different from the assigned starting probability.

12. The method of claim 11 further comprising performing a check on the retransmitted packet to ascertain if the retransmitted packet has been corrupted and, if the retransmitted packet has been corrupted, storing forward or reverse state information associated with the retransmitted packet for use in subsequent decoding attempts.

13. The method of claim 12 further comprising:
 determining whether the H-ARQ transmission mode is on responsive to receiving an input sequence; and
 if the H-ARQ transmission mode is not on, assigning forward or reverse state probabilities to one or more packets associated with the input sequence and attempting to decode the input sequence.

14. The method of claim 12 further comprising prior to storing the forward or reverse state information, determining whether a maximum retransmission number has been reached and, if so, ignoring the retransmitted packet.

15. The method of claim 14, wherein the act of storing is performed if the maximum retransmission number has not been reached.

16. The method of claim 11 further comprising for a packet that is not a retransmitted packet, assigning forward or reverse state probabilities to the packet, performing a check to ascertain whether the packet has been corrupted, and if the packet has been corrupted, storing forward or reverse state information associated with the packet for use in subsequent decoding attempts.

17. The method of claim 11, wherein the packet is compliant with the Institute of Electrical and Electronics Engineers (IEEE) 802.16e-2005 standard.

18. The method of claim 11, wherein the forward or reverse state information comprises an alpha calculation and a beta calculation associated with the previously-transmitted packet.

19. A system comprising:
 means for receiving a packet transmitted in an hybrid automatic repeat request (H-ARQ) transmission mode;
 for a retransmitted packet, means for reading buffered forward or reverse state information associated with a previously-transmitted packet, at least a portion of the previously-transmitted packet corrupted or not decodable; and
 means for assigning, based on the buffered forward or reverse state information, a starting probability to a trellis state of a convolutional-turbo-code (CTC) decoder having an unknown starting state to attempt to decode the retransmitted packet, the unknown starting state being a state in which all trellis states of the CTC decoder have a same initial probability that is different from the assigned starting probability.

20. The system of claim 19, wherein the packet is compliant with the Institute of Electrical and Electronics Engineers (IEEE) 802.16e-2005 standard.

21. The system of claim 19, wherein the packet is compliant with the Institute of Electrical and Electronics Engineers (IEEE) 802.16 Cor2/D42007 standard.

22. The system of claim 19, wherein the buffered forward or reverse state information comprises an alpha calculation and a beta calculation associated with the previously-transmitted packet.

* * * * *